United States Patent
Chen

(10) Patent No.: US 10,112,238 B2
(45) Date of Patent: Oct. 30, 2018

(54) HOLDING SLEEVE OF A KNIFE HOLDER

(71) Applicant: Ching-Ting Chen, Taichung (TW)

(72) Inventor: Ching-Ting Chen, Taichung (TW)

( * ) Notice: Subject to any disclaimer, the term of this patent is extended or adjusted under 35 U.S.C. 154(b) by 101 days.

(21) Appl. No.: 15/169,324

(22) Filed: May 31, 2016

(65) Prior Publication Data

US 2017/0341158 A1    Nov. 30, 2017

(51) Int. Cl.
*B23B 31/20* (2006.01)
*B23B 31/10* (2006.01)

(52) U.S. Cl.
CPC ............ *B23B 31/102* (2013.01); *B23B 31/20* (2013.01); *B23B 2231/2097* (2013.01); *B23B 2231/24* (2013.01); *B23B 2250/12* (2013.01); *Y10T 279/17111* (2015.01); *Y10T 279/17324* (2015.01); *Y10T 279/17418* (2015.01)

(58) Field of Classification Search
CPC ..... B23B 31/102; B23B 31/20; B23B 31/202; B23B 2231/20; B23B 2231/2089; B23B 2231/2097; B23B 2231/24; B23B 2250/12; Y10T 279/17411; Y10T 279/17418; Y10T 279/17111; Y10T 279/17324; Y10T 279/17316; Y10T 279/17427

See application file for complete search history.

(56) References Cited

U.S. PATENT DOCUMENTS

| | | | | |
|---|---|---|---|---|
| 5,358,360 | A * | 10/1994 | Mai ................... | B23Q 11/1084 279/20 |
| 8,925,930 | B2 * | 1/2015 | Komine ................. | B23B 31/20 279/42 |
| 2011/0158755 | A1 * | 6/2011 | Churlet ................. | B23B 27/007 407/11 |
| 2015/0048576 | A1 * | 2/2015 | Lee ..................... | B23B 31/1075 279/20 |
| 2015/0283627 | A1 * | 10/2015 | Borapura .............. | B23B 31/305 279/20 |

FOREIGN PATENT DOCUMENTS

| | | | | |
|---|---|---|---|---|
| DE | 202011004231 | U1 * | 8/2011 | ........... B23B 31/201 |
| DE | 202012104969 | U1 * | 2/2013 | ............ B23B 31/02 |
| JP | 08099245 | A  * | 4/1996 | |
| JP | 2004148429 | A  * | 5/2004 | |
| KR | 101522867 | B1 * | 5/2015 | ........... B23B 31/202 |

OTHER PUBLICATIONS

Machine translation, WIPO document WO2015102163, (equivalent to Korea Patent Document, KR101522867, Park et al., May 26, 2015.), Jul. 2015.*
Machine translation, Germany Patent Document, DE 202011004231, Schunk GMBH & Co., Aug. 11, 2011.*

* cited by examiner

*Primary Examiner* — Eric A Gates
*Assistant Examiner* — Chwen-Wei Su
(74) *Attorney, Agent, or Firm* — Hershkovitz & Associates, PLLC; Abe Hershkovitz

(57) ABSTRACT

A holding sleeve has a sleeve body having multiple clamping slits, and an outlet portion. The clamping slits are defined longitudinally and radially in the outer surface, are arranged at even angular intervals and communicate with the rotary cutting tool hole. Each clamping slit has a first end and a lateral branch. The lateral branch extends laterally from the first end of the clamping slit and communicates with the clamping slit. The outlet portion is formed in the outer end of the sleeve body and communicates with the lateral branches of the clamping slits.

6 Claims, 13 Drawing Sheets

HOLDING SLEEVE OF A KNIFE HOLDER

BACKGROUND OF THE INVENTION

1. Field of the Invention

The present invention relates to a holding sleeve, and more particularly to a holding sleeve of a rotary cutting tool holder that can provide different discharging ways of cooling liquids.

2. Description of Related Art

A rotary cutting tool holder of a machine has a holding sleeve to clamp a rotary cutting tool securely, and the holding sleeve has recesses or holes to allow cooling liquid to pass through the holding sleeve so as to cool the rotary cutting tool.

However, the conventional holding sleeve has only one single way of discharging cooling liquid from the holding sleeve, but the single way of discharging cooling liquid cannot be changed to fit with different types of rotary cutting tools. Therefore, the conventional holding sleeve is not versatile in use.

To overcome the shortcomings, the present invention tends to provide a holding sleeve of a rotary cutting tool holder to mitigate or obviate the aforementioned problems.

SUMMARY OF THE INVENTION

The main objective of the invention is to provide a holding sleeve of a rotary cutting tool holder that can provide different discharging ways of cooling liquids.

The holding sleeve has a sleeve body. The sleeve body has an inner end, an outer end, an outer surface, an annular groove, a rotary cutting tool hole, multiple clamping slits, and an outlet portion. The annular groove is defined around the outer surface at a position adjacent to the outer end. The rotary cutting tool hole is axially defined through the sleeve body. The clamping slits are defined longitudinally and radially in the outer surface, are arranged at even angular intervals and communicate with the rotary cutting tool hole. Each clamping slit has a first end, a second end, and a lateral branch. The first end and the second end are respectively adjacent to the annular groove and the inner end. The lateral branch extends laterally from the first end of the clamping slit and communicates with the clamping slit. The outlet portion is formed in the outer end of the sleeve body and communicates with the lateral branches of the clamping slits.

Other objects, advantages and novel features of the invention will become more apparent from the following detailed description when taken in conjunction with the accompanying drawings.

DETAILED DESCRIPTION OF PREFERRED EMBODIMENT

Figure 1:
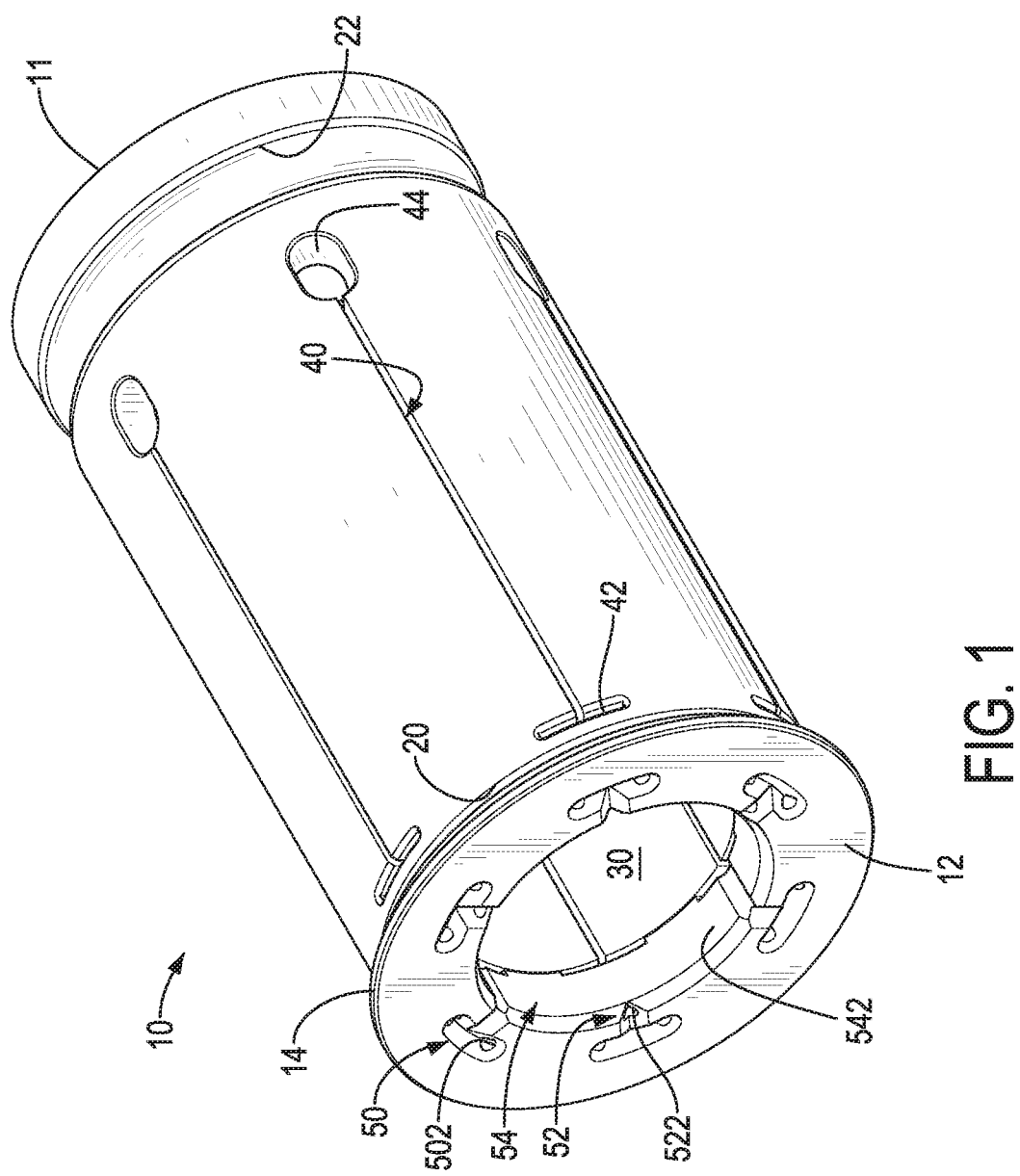
FIG. 1 is a perspective view of a holding sleeve in accordance with the present invention.

With reference to FIG. 1, a holding sleeve of a rotary cutting tool holder in accordance with the present invention comprises a sleeve body 10. The sleeve body 10 has an inner end 11, an outer end 12, an outer surface, an annular groove 20, a rotary cutting tool hole 30, multiple clamping slits 40, and an outlet portion. The outer end 12 has a diameter larger than a diameter of the inner end 11 to form a stopping flange 14 on the outer surface at the outer end 12 of the sleeve body 10.

The annular groove 20 is defined around the outer surface at a position adjacent to the outer end 12. The rotary cutting tool hole 30 is axially defined through the sleeve body 10 to hold a rotary cutting tool inside. The clamping slits 40 are defined longitudinally and radially in the outer surface, are arranged at even angular intervals and communicate with the rotary cutting tool hole 30. Each clamping slit 40 has a first end, a second end, a lateral branch 42, and an expansion hole 44. The first end and the second end are respectively adjacent to the annular groove 20 and the inner end 11. The lateral branch 42 extends laterally from the first end of the clamping slit 40 and communicates with the clamping slit 40. The expansion hole 44 is defined in the second end of the clamping slit 40.

The outlet portion is formed in the outer end 12 of the sleeve body 10 and communicates with the lateral branches 42 of the clamping slits 40. The outlet portion comprises multiple outlet segments 50, 52, 54 including a first outlet segment 50, a second outlet segment 52, and a third outlet segment 54. The first outlet segment 50 comprises multiple sets of outlet holes. Each set of outlet holes comprises two first outlet holes 502 defined in the outer end 12 of the sleeve body 10 and communicating with the lateral branch 42 of one of the clamping slits 40. The second outlet segment 52 comprises multiple second outlet holes 522 defined in the outer end 12 of the sleeve body 10 and communicating respectively with the lateral branches 42 of the clamping slits 40. In practice, the second outlet holes 522 are located respectively at positions that are respectively adjacent to the sets of the outlet holes of the first outlet segment 50. The third outlet segment 54 comprises an annular outlet recess 542 defined in an inner surface of the rotary cutting tool hole 30 at the outer end 12 of the sleeve body 10 and communicating with the lateral branches 42 of the clamping slits 40.

In addition, the sleeve body 10 may further have an annular recess 22 defined around the outer surface of the sleeve body 10 at a position between the clamping slits 40 and the inner end 11 of the sleeve body 10. The diameter of the sleeve body 10 between the inner end 11 and the annular recess 22 of the sleeve body 10 is smaller than the diameter of the sleeve body 10 between the annular recess 22 and the outer end 12 of the sleeve body 10.

Figure 2:
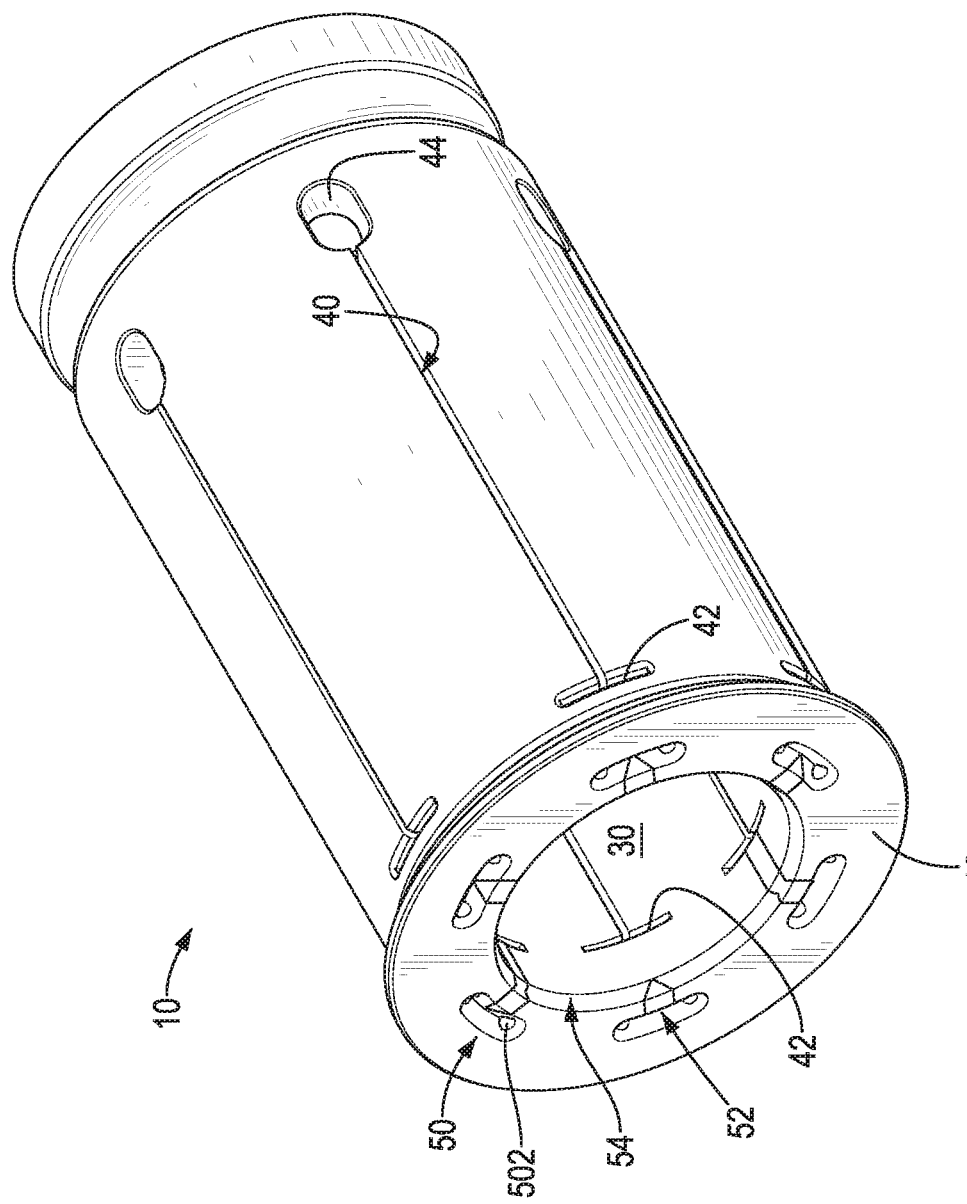
FIG. 2 is a perspective view of a first operational embodiment of the holding sleeve in FIG. 1.
Figure 3:
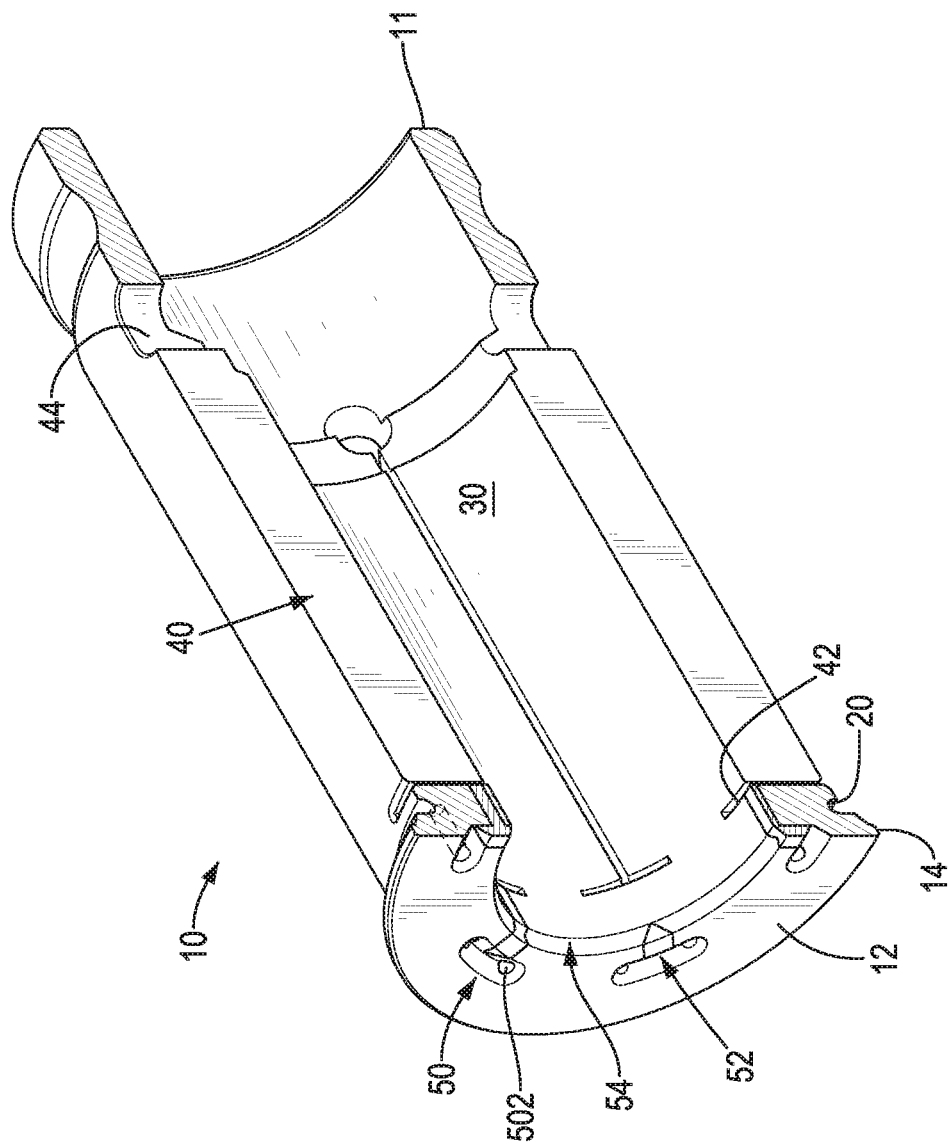
FIG. 3 is a perspective view in partial section of the first operational embodiment of the holding sleeve in FIG. 2.

With reference FIGS. 2 and 3, in a first operational embodiment, the second outlet segment 52 and the third outlet segment 54 are completely blocked, and the first outlet segment 50 is kept from being blocked and is kept open.

Figure 4:
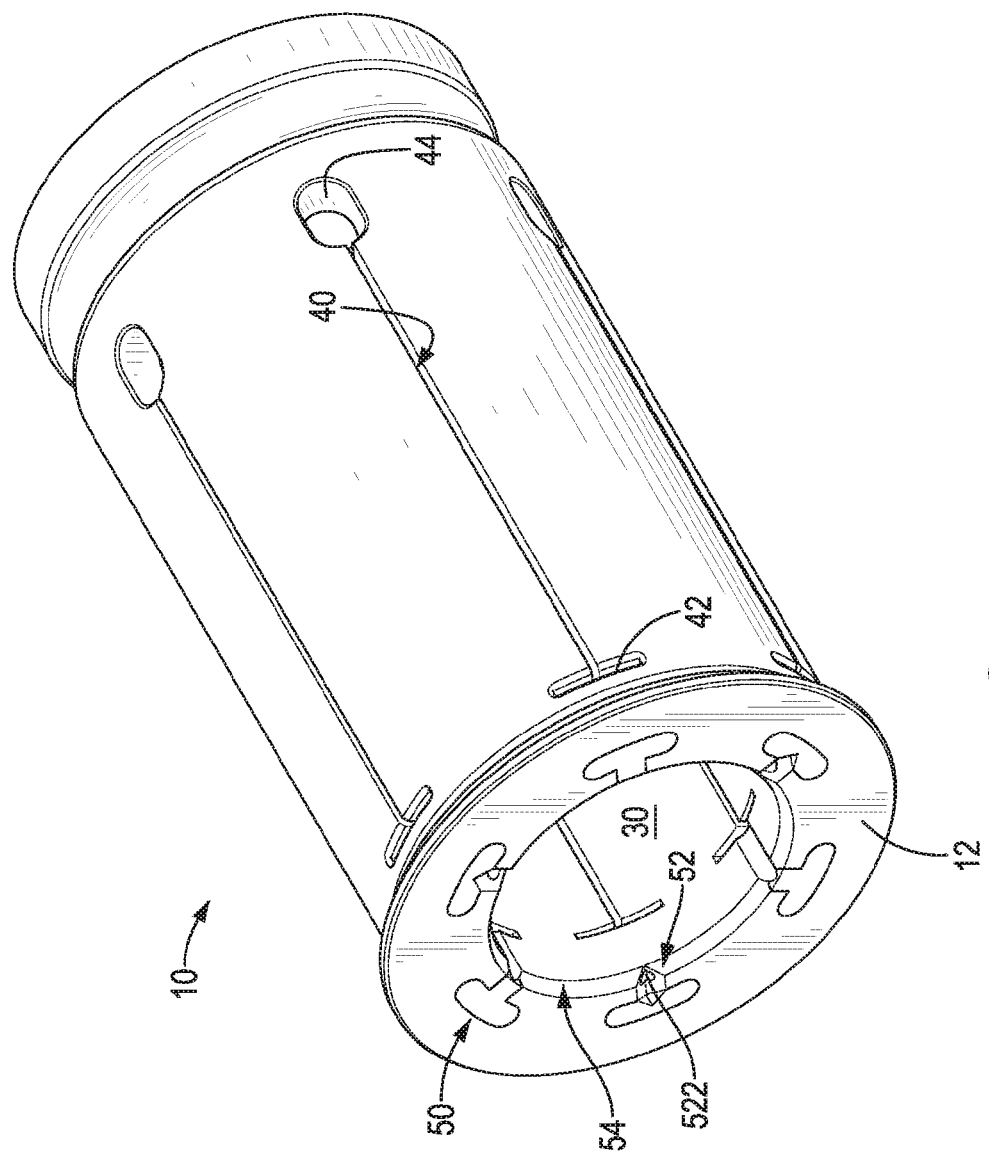
FIG. 4 is a perspective view of a second operational embodiment of the holding sleeve in FIG. 1.

With reference FIG. 4, in a second operational embodiment, the first outlet segment 50 and the third outlet segment 54 are completely blocked, and the second outlet segment 52 is kept from being blocked and is kept open.

Figure 5:
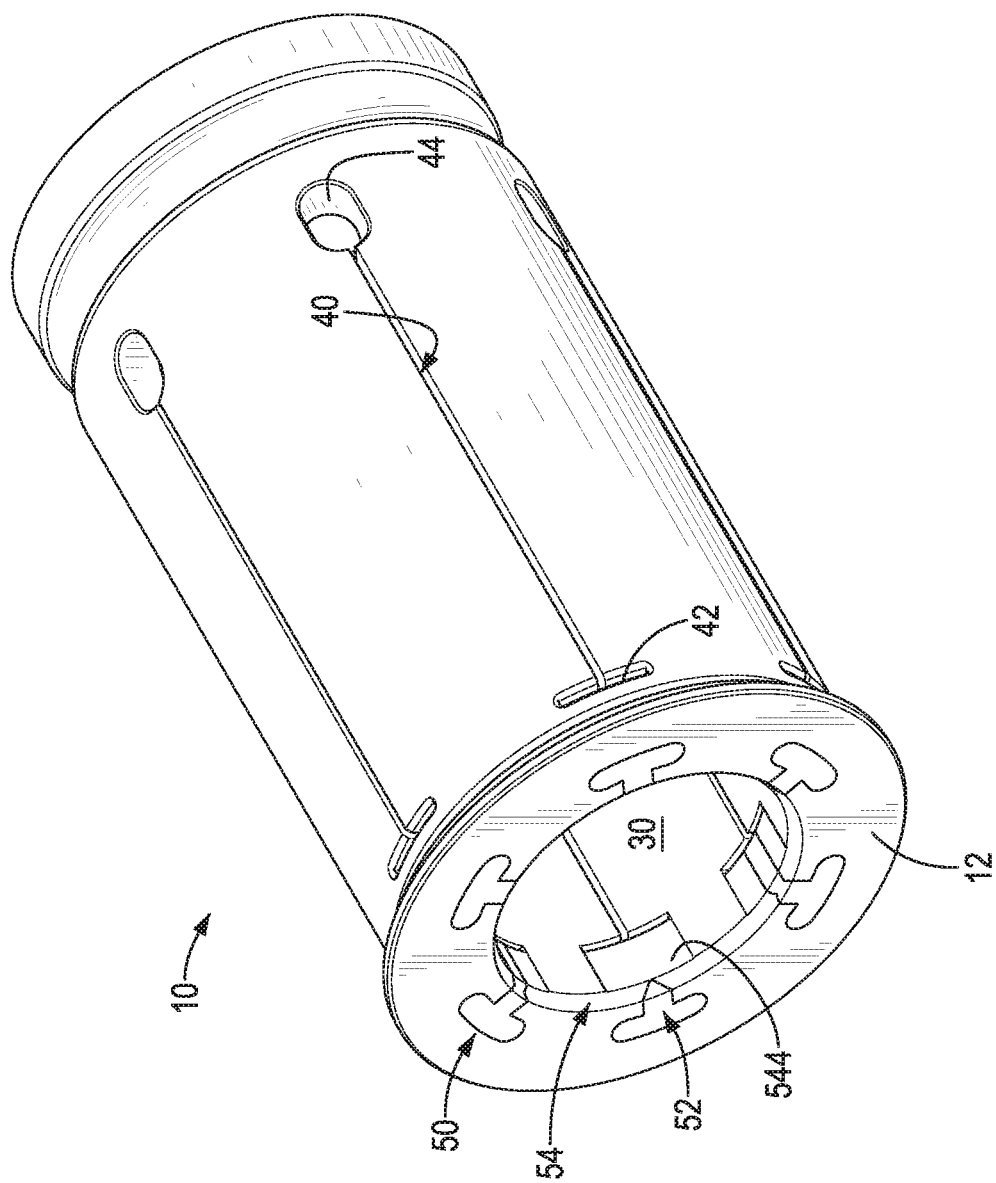
FIG. 5 is a perspective view of a third operational embodiment of the holding sleeve in FIG. 1.

With reference FIG. 5, in a third operational embodiment, the first outlet segment 50 and the second outlet segment 52 are completely blocked, and the third outlet segment 54 is partially blocked to form multiple outlet notches 544 respectively communicating with the lateral branches 42 of the clamping slits 40.

Figure 6:
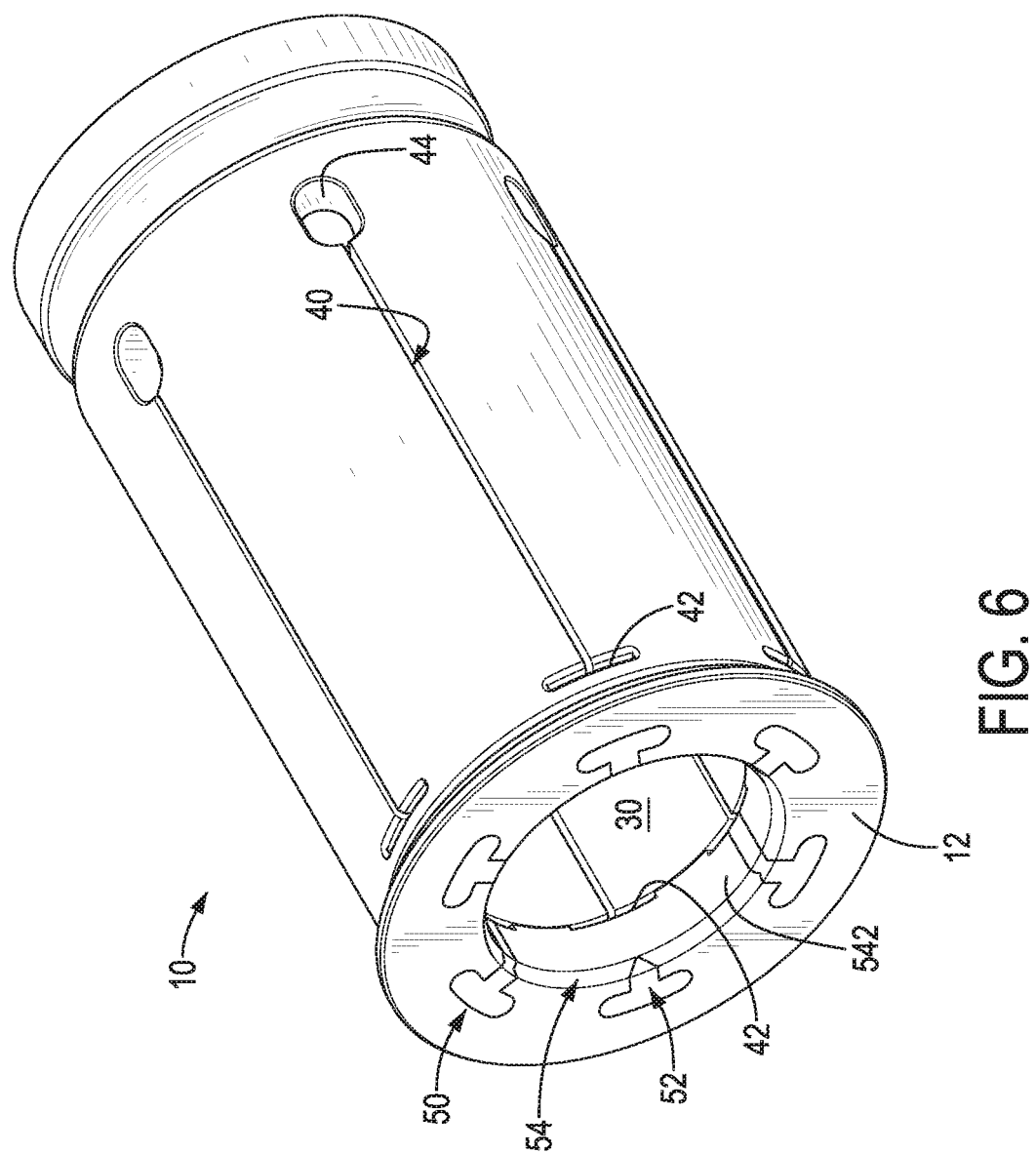
FIG. 6 is a perspective view of a fourth operational embodiment of the holding sleeve in FIG. 1.
Figure 7:
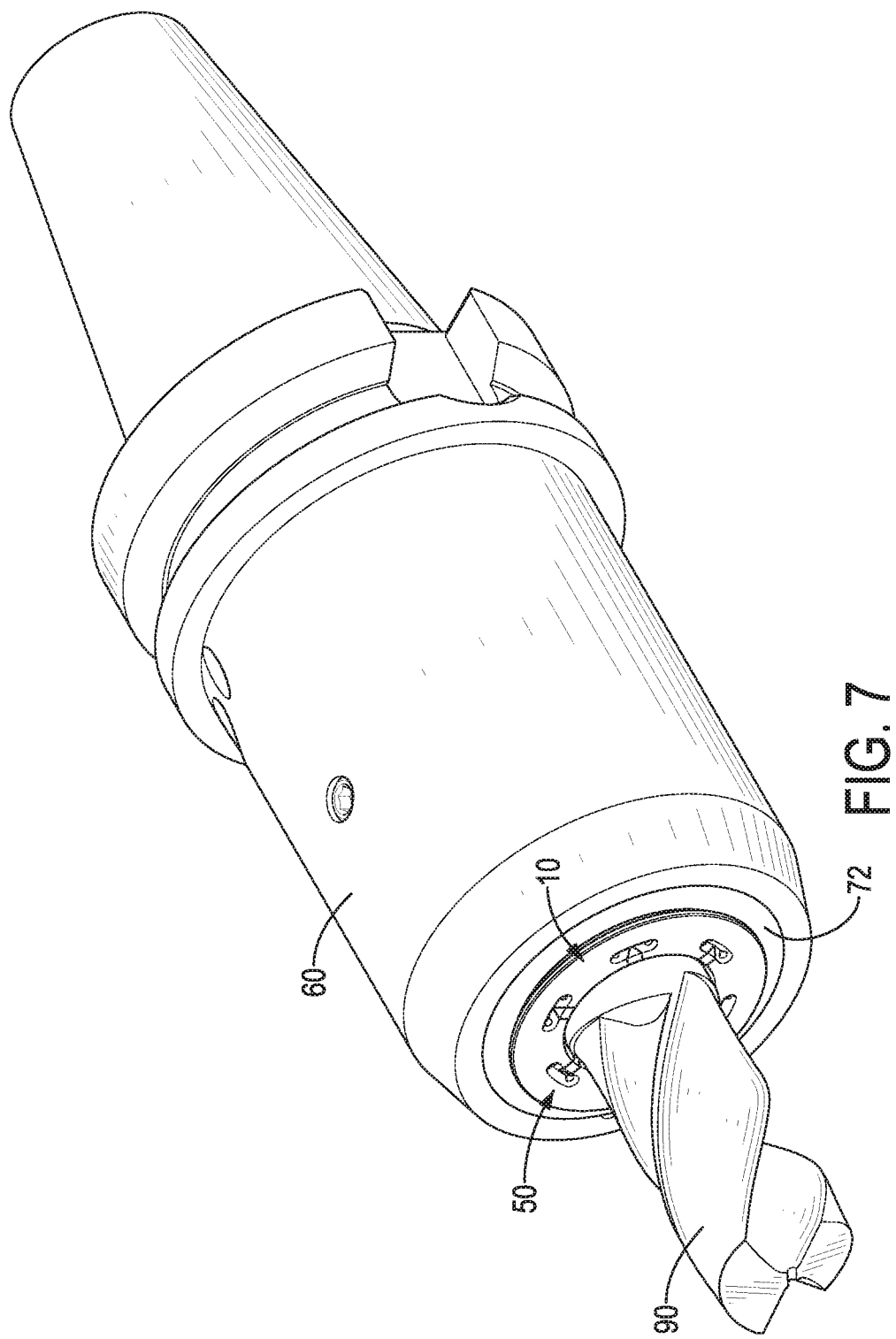
FIG. 7 is an operational perspective view of the first operational embodiment of the holding sleeve in FIG. 2 assembled in a rotary cutting tool holder.
Figure 8:
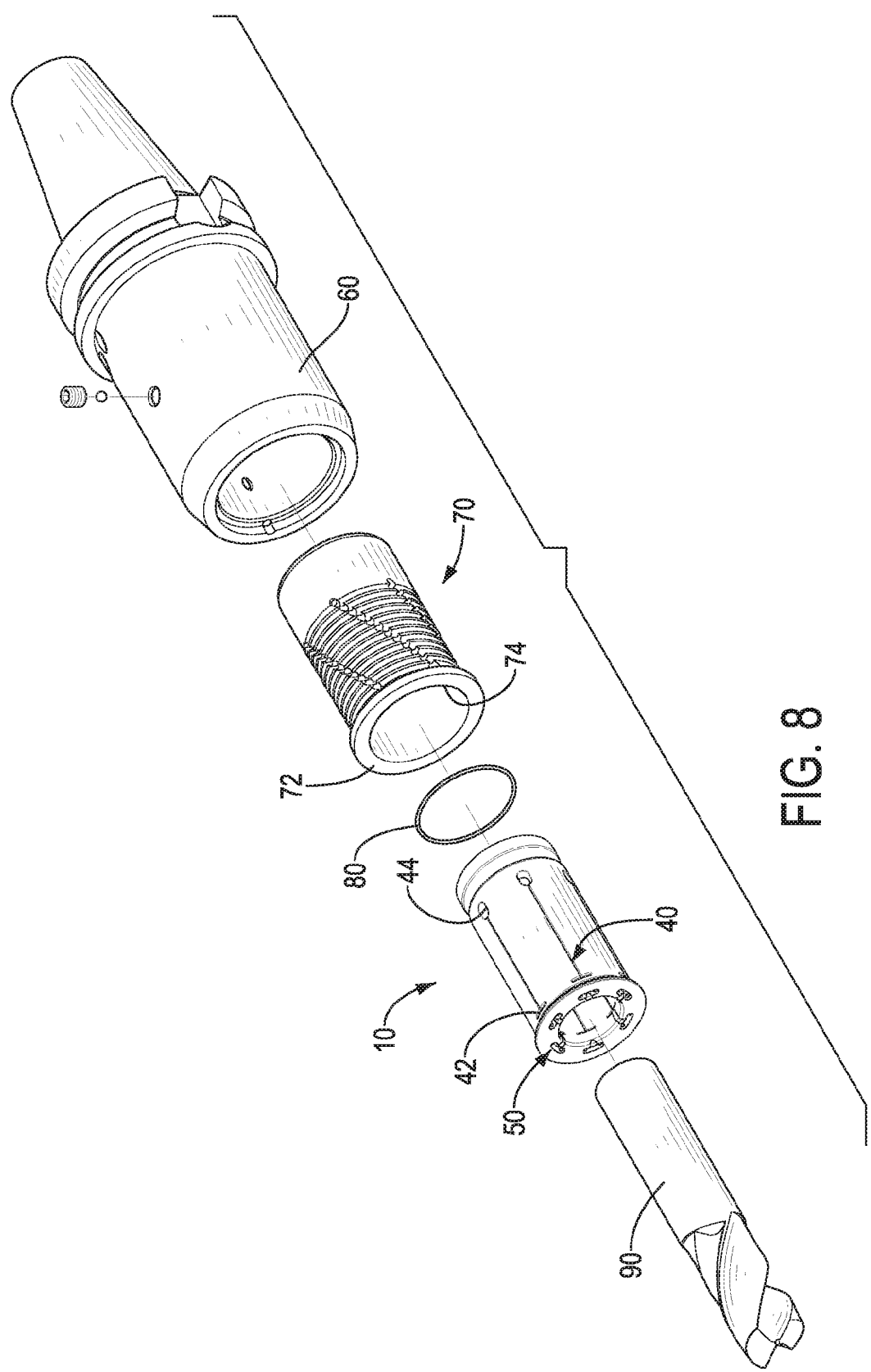
FIG. 8 is an exploded perspective view of the rotary cutting tool holder in FIG. 7.
Figure 9:
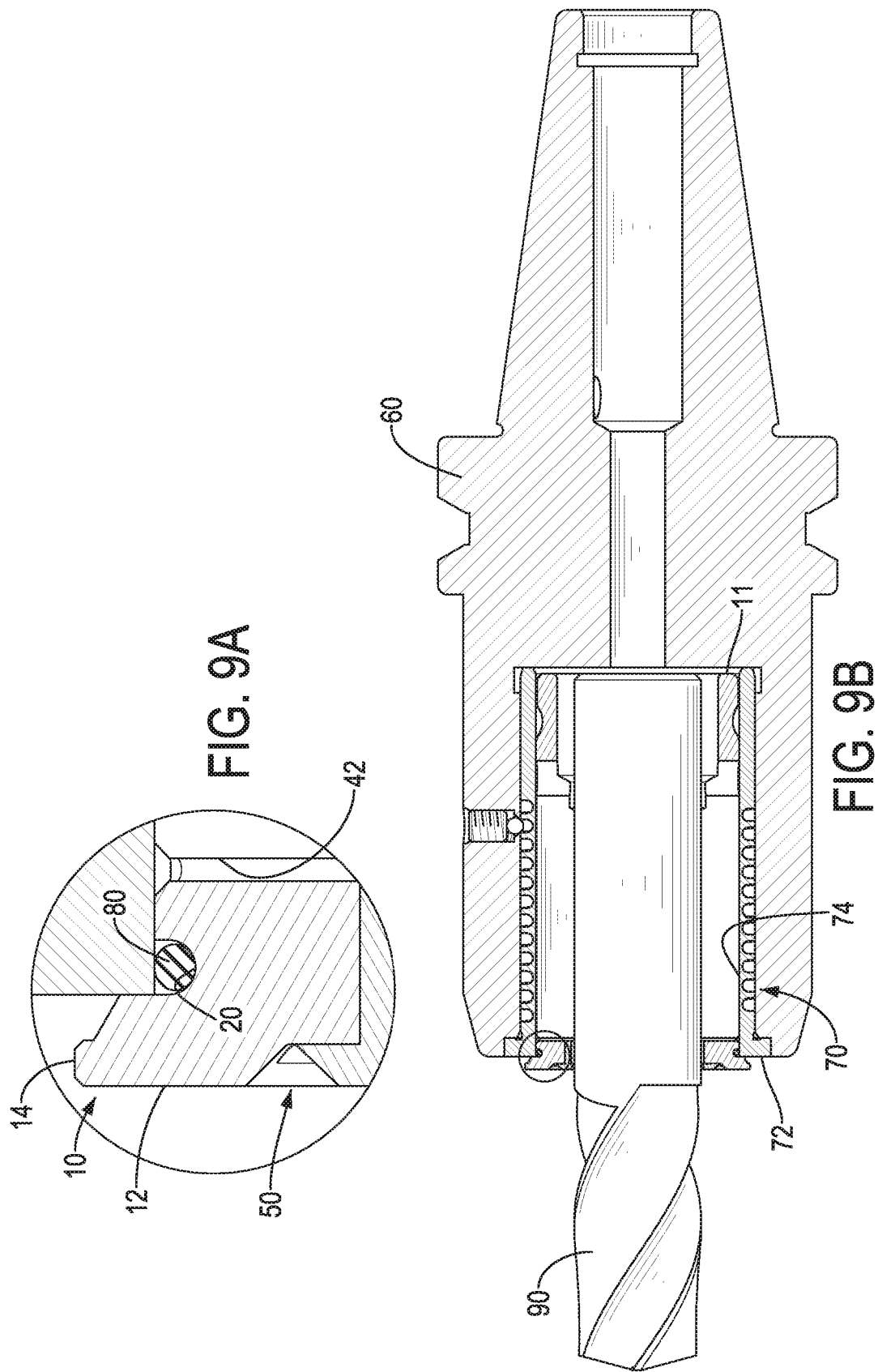
FIG. 9A is a side view in partial section of the rotary cutting tool holder in FIG. 7.
FIG. 9B is an enlarged cross sectional side view of the rotary cutting tool holder in FIG. 9A.

With reference FIG. 6, in a fourth operational embodiment, the first outlet segment 50 and the second outlet segment 52 are completely blocked, and the third outlet segment 54 is kept from being blocked and is kept open.

In use, with reference to FIGS. 7, 8, 9A and 9B, the holding sleeve is mounted in a body 60 of a rotary cutting tool holder to clamp and hold a rotary cutting tool 90 in the holding sleeve. The rotary cutting tool holder comprises the body 60, an inner sleeve 70, and an O-ring 80. The body 60 is hollow to hold the inner sleeve 70 and the holding sleeve inside. The inner sleeve 70 is mounted in the body 60 and has an abutting flange 72 and a compressing hole 74. The abutting flange 72 is formed around an end of the inner sleeve 70, and the compressing hole 74 is axially defined through the inner sleeve 70. The O-ring 80 is mounted in the annular groove 20 in the sleeve body 10 of the holding sleeve. To assemble a rotary cutting tool 90 with the rotary cutting tool holder, the rotary cutting tool 90 is inserted into the rotary cutting tool hole 30 in the sleeve body 10 of the holding sleeve. The stopping flange 14 on the sleeve body 10 abuts the abutting flange 72 on the inner sleeve 70. The holding sleeve is then mounted in the compressing hole 74 in the inner sleeve, and the inner sleeve 70 with the holding sleeve and the rotary cutting tool 90 is inserted into the body 60. The O-ring 80 abuts against an inner surface of the compressing hole 74 to prevent cooling liquid from leaking from a gap between the sleeve body 10 of the holding sleeve and the inner sleeve 70.

Figure 10:
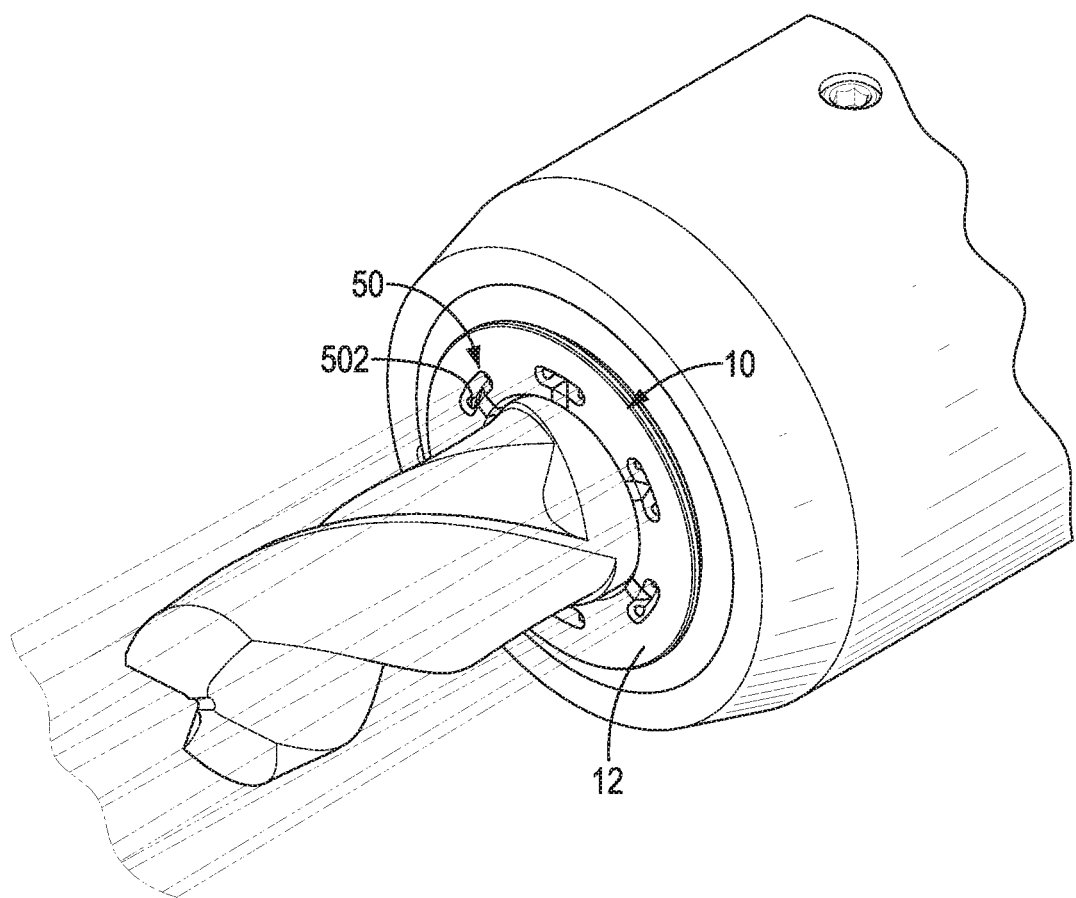
FIG. 10 is an operational perspective view of the first operational embodiment of the holding sleeve in FIG. 2.

With reference to FIGS. 2, 3, and 10, when the first operational embodiment of the holding sleeve in accordance with the present invention is applied, cooling liquid is led into the body 60 of the rotary cutting tool holder and flows to the inner end 11 of the sleeve body 10, and flows into the clamping slits 40 via the expansion holes 44. Then, the cooling liquid flows into the lateral branches 42 of the clamping slits 40 and is discharged from the first outlet holes 502 of the first outlet segment 50 because the second and third outlet segments 52, 54 are completely blocked.

Figure 11:
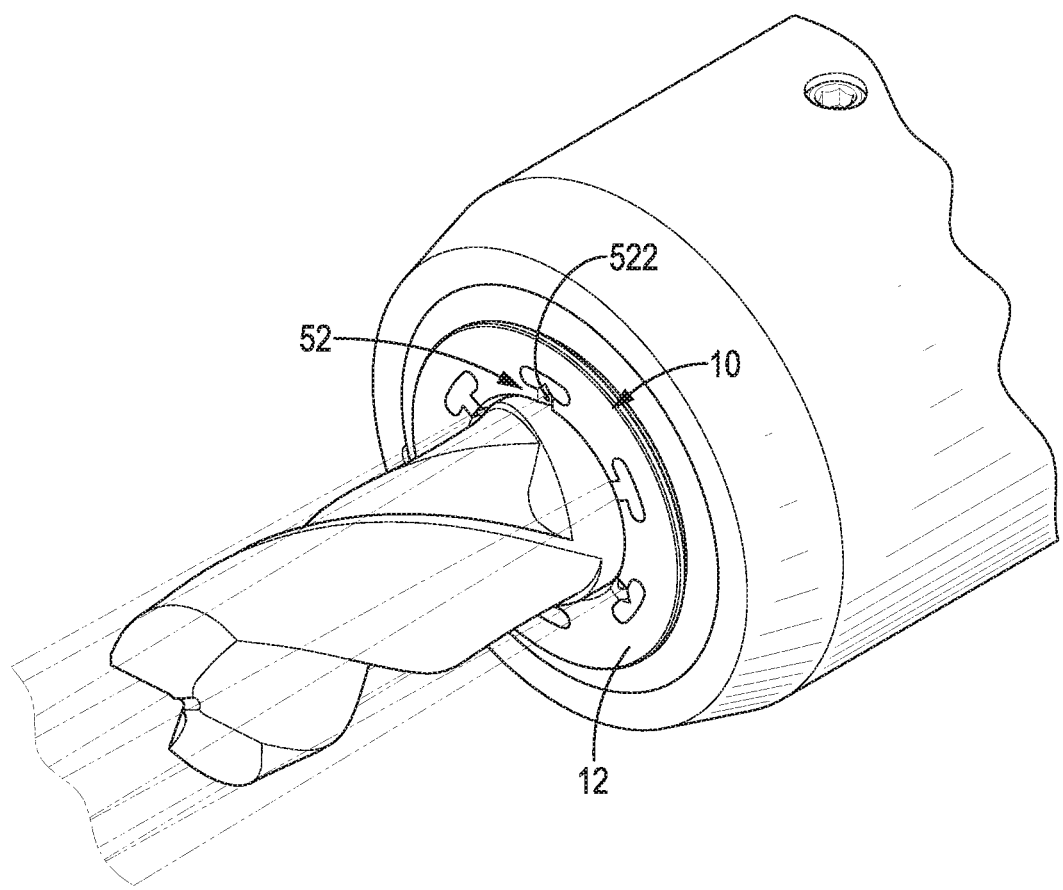
FIG. 11 is an operational perspective view of the second operational embodiment of the holding sleeve in FIG. 4.

With reference to FIGS. 4, and 11, in the second operational embodiment, the cooling liquid is discharged from the second outlet holes 522 of the second outlet segment 52 because the first and third outlet segments 50, 54 are completely blocked.

Figure 12:
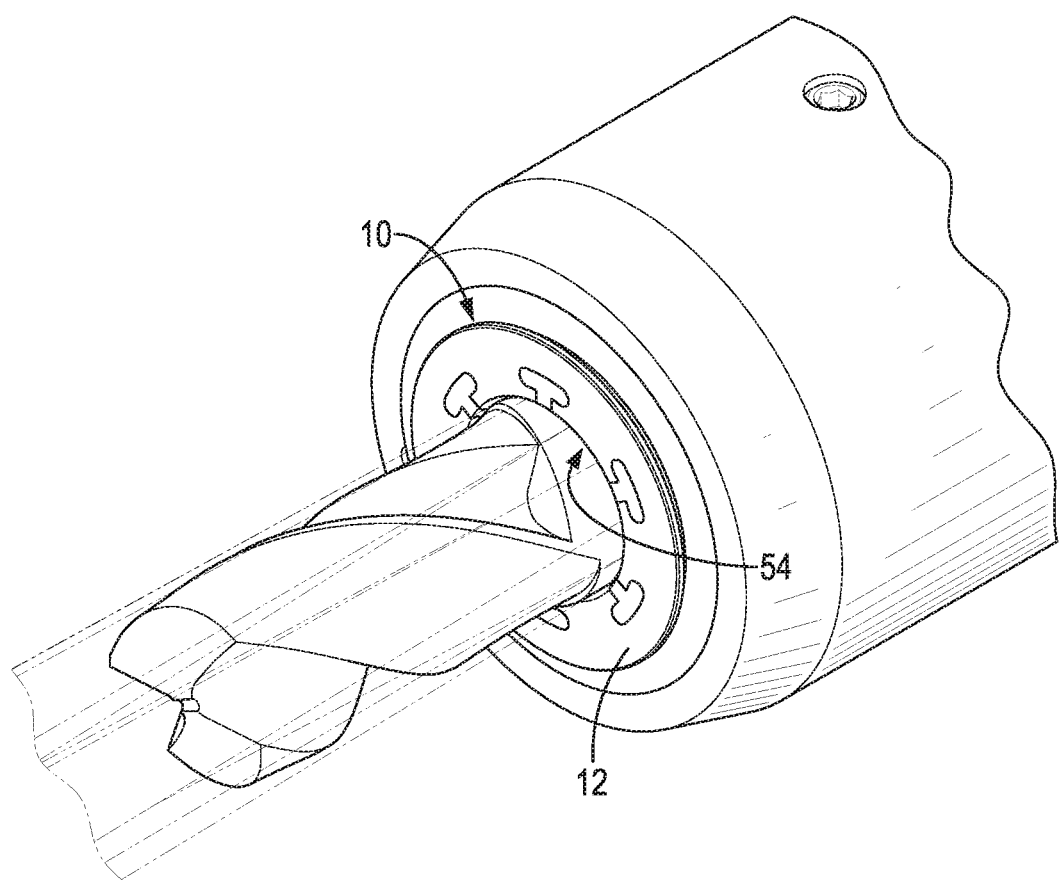
FIG. 12 is an operational perspective view of the third operational embodiment of the holding sleeve in FIG. 5.

With reference to FIGS. 5, and 12, in the third operational embodiment, the cooling liquid is discharged from the second outlet notches 544 of the third outlet segment 54 because the first and second outlet segments 50, 52 are completely blocked and the third outlet segment 54 is partially blocked.

Figure 13:
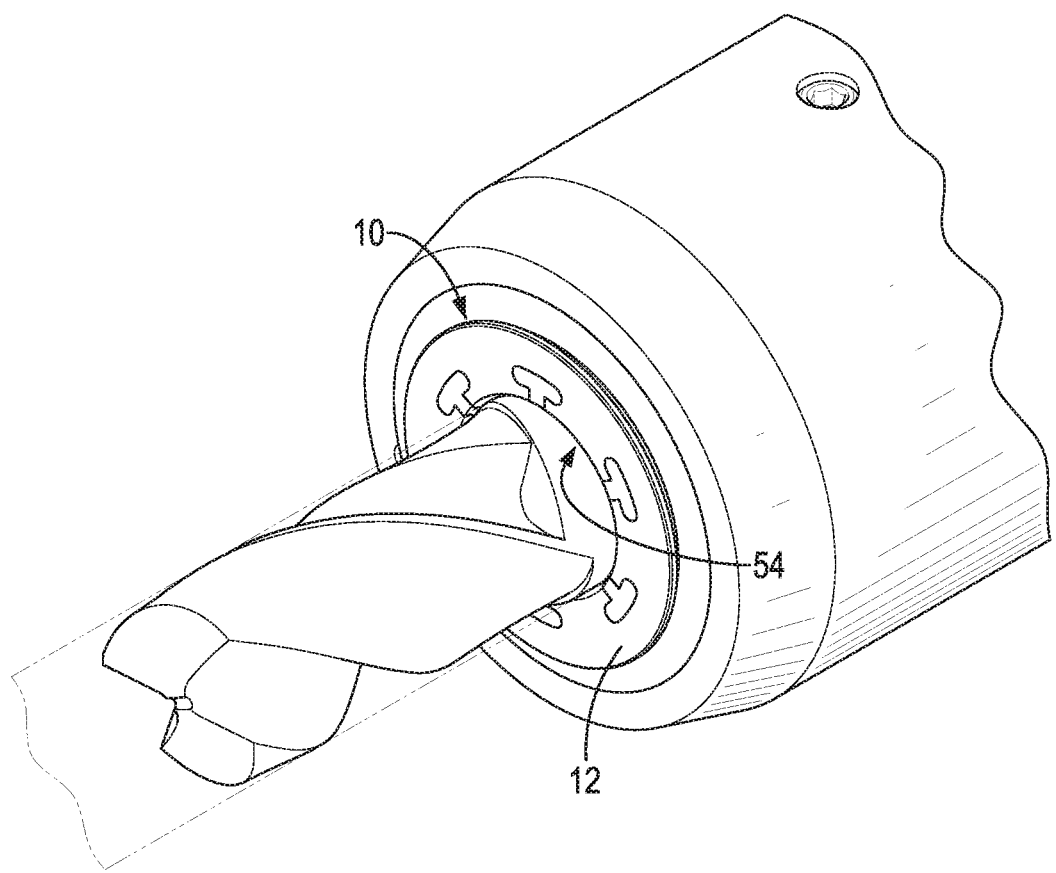
FIG. 13 is an operational perspective view of the fourth operational embodiment of the holding sleeve in FIG. 6.

With reference to FIGS. 6, and 13, in the fourth operational embodiment, the cooling liquid is discharged from the annular outlet recess 542 of the third outlet segment 54 because the first and second outlet segments 50, 52 are completely blocked.

With such an arrangement, the discharging way of the cooling liquid can be changed to fit with different types of rotary cutting tools for different working demands by blocking some of the outlet segments 50, 52, 54, and the holding sleeve in accordance with the present invention is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A holding sleeve for a rotary cutting tool holder comprising:
    a sleeve body having
        an inner end;
        an outer end;
        an outer surface;
        an annular groove defined around the outer surface at a position adjacent to the outer end;
        a rotary cutting tool hole axially defined through the sleeve body;
        multiple clamping slits defined longitudinally and radially in the outer surface, arranged at even angular intervals and communicating with the rotary cutting tool hole, and each clamping slit having
            a first end and a second end being respectively adjacent to the annular groove and the inner end; and
            a lateral branch extending laterally from the first end of the clamping slit, defined in the outer surface of the sleeve body, and communicating with the clamping slit; and
        an outlet portion formed in the outer end of the sleeve body and communicating with the lateral branches of the clamping slits, wherein the outlet portion comprises multiple outlet segments including:
            a first outlet segment comprising multiple sets of outlet holes, and each set of outlet holes comprising two first outlet holes defined in the outer end of the sleeve body and communicating with the lateral branch of one of the clamping slits;
            a second outlet segment comprising multiple second outlet holes defined in the outer end of the sleeve body and communicating respectively with the lateral branches of the clamping slits; and
            a third outlet segment comprising an annular outlet recess defined in an inner surface of the rotary cutting tool hole at the outer end of the sleeve body and communicating with the lateral branches of the clamping slits.

2. The holding sleeve as claimed in claim 1, wherein each clamping slit has an expansion hole defined in the second end of the clamping slit.

3. The holding sleeve as claimed in claim 1, wherein the sleeve body further has an annular recess defined around the outer surface of the sleeve body at a position between the clamping slits and the inner end of the sleeve body; and
  a diameter of the sleeve body between the inner end and the annular recess of the sleeve body is smaller than a diameter of the sleeve body between the annular recess and the outer end of the sleeve body.

4. The holding sleeve as claimed in claim 1, wherein the outer end of the sleeve body has a diameter larger than a diameter of the inner end of the sleeve body to form a stopping flange on the outer surface at the outer end of the sleeve body.

5. The holding sleeve as claimed in claim 4, wherein each clamping slit has an expansion hole defined in the second end of the clamping slit.

6. The holding sleeve as claimed in claim 5, wherein the sleeve body further has an annular recess defined around the outer surface of the sleeve body at a position between the clamping slits and the inner end of the sleeve body; and
  a diameter of the sleeve body between the inner end and the annular recess of the sleeve body is smaller than a diameter of the sleeve body between the annular recess and the outer end of the sleeve body.

* * * * *